United States Patent
Gu et al.

(10) Patent No.: US 8,088,422 B2
(45) Date of Patent: Jan. 3, 2012

(54) PURIFIED PYRROLOQUINOLINE QUINONE FORTIFIED FOOD

(75) Inventors: Jianxin Gu, Shanghai (CN); Xiaojing Yun, Shanghai (CN); Xiaoning Chen, Shanghai (CN); Si Zhang, Shanghai (CN); Junwu Yang, Shanghai (CN); Yihong Wu, Shanghai (CN)

(73) Assignee: Shanghai Medical Life Science Research Center, Ltd., Co., Shanghai (CN)

( * ) Notice: Subject to any disclaimer, the term of this patent is extended or adjusted under 35 U.S.C. 154(b) by 240 days.

(21) Appl. No.: 12/037,074

(22) Filed: Feb. 25, 2008

(65) Prior Publication Data

US 2009/0191320 A1 Jul. 30, 2009

(30) Foreign Application Priority Data

Jan. 25, 2008 (CN) .......................... 2008 1 0033088

(51) Int. Cl.
*A23C 3/00* (2006.01)
(52) U.S. Cl. ....................... 426/330.2; 426/321; 426/327
(58) Field of Classification Search ................. 426/330.2
See application file for complete search history.

(56) References Cited

U.S. PATENT DOCUMENTS

2003/0165574 A1* 9/2003 Ward et al. ..................... 424/535
2006/0194828 A1* 8/2006 Kasahara et al. ............. 514/291

OTHER PUBLICATIONS

Decker, Eric A. "The role of phenolics, conjugated linoleic acid, carnosine and pyrroloquinoline quinone as nonessential dietary antioxidants." Nutrition Reviews. Washington. Mar. 1995. vol. 53, Iss. 3. pp. 49-59. Published by International Life Sciences Institute and Nutrition Foundation, Mar. 1995. Retrieved Oct. 30, 2009.*
Jay, James M. "Modern Food Microbiology." 1996, Chapman & Hall, 5th Edition, pp. 137 and 286-287.*
South Carolina Dept. of Health and Environmental Control. "Pasteurized Milk and Milk Products—Regulation 61-34.1" Online Publication date: Sep. 26, 2006 retrieved from web archives. p. 5.*

* cited by examiner

*Primary Examiner* — Chhaya Sayala
*Assistant Examiner* — Jenna A Watts
(74) *Attorney, Agent, or Firm* — Yuan Qing Jiang (57) ABSTRACT

Food products fortified by purified PQQ and methods of application and production are disclosed. A method of preserving a food product comprising admixing an effective amount of purified PQQ or a compound containing purified PQQ derivatives with a foodstuff to provide an inhibiting means to microorganism growth in the food product.

7 Claims, 2 Drawing Sheets

FIG. 2

PURIFIED PYRROLOQUINOLINE QUINONE FORTIFIED FOOD

FIELD OF INVENTION

The present invention relates to a method and composition of anti-microbial growth in food products whereby prolonging shelf life of the food products, as well as methods of producing the same.

BACKGROUND OF INVENTION

Food spoilage is a common problem in daily life. According to Food Science Australia and the national Cold Chain Center's estimation, 20 billion dollars are wasted globally each year due to spoilage of perishable foods during transportation and storage (Food Magazine, April 2006).

One of the major causes of food spoilage is growth of microorganisms in food products. Currently known microorganisms that cause food spoilage are fungi such as *Geotrichum candidum*, molds such as *Aspergillus niger* and *Penicillium expansum*, various yeasts, spoilage bacteria such as *Alcaligenes faecalis*, *Bacillus stearothermophilus*, *Lactobacillus acidophilus* and *Pseudomonas fluorescens*, pathogenic bacteria such as *Bacillus cereus*, *Staphylococcus aureus*, *Listeria monocytogenes*, *Yersinia enterocolitica*, *Salmonella typhimurium*, *Salmonella hydelberg*, *Salmonella enteritidis*, *Escherichia coli* O157:H7, *Campylobacter jejuni*, *Clostridium botulinum*, *Clostridium perfringens*, *Shigella sonnei*, *Shigella dysenteriae*, *Shigella flexneri*, *Shigella boydii*, *Vibrio cholera* and *Lysteria monocytogenes*, and certain virus such as Norovirus and hepatitis virus.

People have been developing methods to prevent the growth of spoilage and pathogenic microorganisms in food products since the dawn of human history. A few well known examples of preserving perishable food products include: drying food including freeze drying beverages, salting food, smoking food, fermenting food, refrigerating food, freezing food, pickling food in syrup, sugar, oil, vinegar or alcohol and adding preserving chemicals such as sulfites, dehydroacetic acid, sodium nitrite, ethyl formate, propionic acid, sorbic acid, benzoic acid into food products.

New techniques to preserve food have been attempted and developed. For example, Nicolas Appert developed method of canning food in 1810. Louis Pasteur's research in 1864 led to the method of pasteurization dairy products. Both methods are still commonly used in food industry nowadays. U.S. Pat. No. 6,955,893 claims a method for preventing spoilage of food with lytic enzyme encoded by bacteriophage, and U.S. Pat. No. 5,654,020 discloses another method of using *Lactobacillus* AS-1 for inhibiting food spoilage.

Another popular anti-spoilage method is irradiation, which is exposing food to ionizing radiation by either gamma rays from radioactive Cobalt-60 or Cesium-137, high energy electrons, or x-rays. Irradiation kills bacteria, molds and insect pests in the food, slows down the ripening and spoiling of fruits, and induces seed sterility at higher doses. Irradiation becomes a major method used to prevent the growth of spoilage and pathogenic microorganisms in perishable food products after banning of methyl bromide fumigation in 2001. Food and Drug Administration (FDA) approved low-doses irradiation for wheat, wheat flour, and potatoes in the early 1960s. FDA approved the use of irradiation to control Salmonella and other harmful bacteria in chicken, turkey, and other fresh and frozen uncooked poultry in May 1990. In December 1997, FDA approved the use of irradiation to control pathogens in fresh and frozen red meats such as beef, lamb, and pork.

However, many food-preserving methods currently in use have their limitations. For example, nutritional value, density, texture and flavor of food may change if the food is dried, salted, smoked, fermented, pickled in syrup, sugar, oil, vinegar, and alcohol, or food preserving chemicals is added to the food. Frozen food and refrigerated food have to be kept in low temperature all the time. Irradiation cannot be used for all foods. It causes undesirable flavor changes in dairy products. Pasteurization eliminates all pathogens, but not all spoilage organisms are killed, since food is subjected to a lower heat treatment.

Food-preserving methods can be gauged by shelf life of the food product, which is the longer the shelf life the better the food-preserving method. Shelf life of food products is the length of time that perishable food products are suitable for sale or consumption before their quality is compromised by certain factors such as microorganism growth. Usually a label of "best before", "use by" or "freshness date" followed by a date is put on packaged perishable food products, indicating their shelf life.

Prolonging the shelf life of food products is still an ongoing research subject. A new technology for preserving food has to meet certain requirements and standards. The food has to maintain its nutritional quality, flavor and safety after the treatment. If synthetic preservers are added to the food, they should be safe for human consumption with no long term adversary effect. Consumers are concerned with synthetic food additives, as well as many antibiotics for their long term effect to general health. Obviously antibiotics cannot be used as food addictives since their use will cause side effects such as allergies and disruption of normal bacterial flora in human body, and their long term use lead to bacterial resistance. Usually antibiotics may have odor, bitter taste or unpleasant color, making them unsuitable for food additives. On the other hand, some food products are fortified with vitamins and minerals, but those additives are not antimicrobials and have no effect to prolong the shelf life of the food products. Therefore there is a need to provide food additive that is natural, effectively antimicrobial and nutritional valuable.

SUMMARY OF THE INVENTION

This invention provides food products fortified by purified Pyrroloquinoline quinone (PQQ) and methods of application and production of the same. In particular, and by way of example only, according to an embodiment, provided is a method of preserving a food product comprising admixing an effective amount of purified PQQ or a compound containing purified PQQ derivatives with a foodstuff to provide an inhibiting means to microorganism growth in the food product.

In yet another embodiment, provided is a method of preparing purified PQQ comprising the steps of cultivating a strain of bacteria in a culture medium, inducing bacteria mutation to obtain mutant bacteria strains, collecting supernatant of the culture medium, isolating PQQ from the supernatant by chromatography, and purifying PQQ and crystallizing PQQ.

DETAILED DESCRIPTION OF THE INVENTION

Pyrroloquinoline quinone (PQQ) was first isolated from bacteria in 1979. It is a tasteless, odorless chemical compound with a molecular formula:

PQQ has been considered as an essential vitamin of vitamin B group, and a new co-factor for reduction-oxidization (redox) reaction after the discovery of redox co-factors nicotinamides and flavins (Nature. Apr. 24, 2003; 422 (6934): 832). A cofactor is a non-protein chemical compound binding to an enzyme and is required for the enzyme's function. The cofactor assists the enzyme in biochemical reactions. An enzyme without a cofactor is called an apoenzyme. An apoenzyme becomes a complete enzyme after a corresponding cofactor is bound to it, and the complete enzyme is called a holoenzyme.

In early days, only some bacteria (methylotrophic bacteria, pseudomonas acetobacter and some gluconobacter species) are known to synthesize PQQ. Now, plant and animal food sources containing this vitamin have been discovered. PQQ content is high in some food such as parsley, papaya, kiwi, green tea, natto (fermented beans), tofu and green peppers. It is interesting to note that human milk has very high concentration of PQQ (140-180 ng/mL), which is approximately 4 to 5 times higher than that in cow milk (Mitchell A E, et al. Analytical Biochemistry 1999; 269:317-325).

PQQ plays important roles in physiological conditions in many organisms. Degradation of essential amino acid lysine depends on PQQ. Lysine is oxidized to 2-aminoadipic 6-semialdehyde (AAS) catalyzed by AAS synthetase (AASS), and then oxidized further to 2-aminoadipic acid by AAS dehydrogenase (AASDH). PQQ acts as a redox cofactor for AASDH in this reaction. PQQ binds all PQQ-dependent enzymes (quinoproteins) in a non-covalent binding form. Many PQQ-dependent enzymes are bound to cell membrane, and PQQ acts as a cofactor for the enzymes, transferring electron during the biochemical reactions. Plenty of PQQ is found in mitochondria, in which it acts as a cofactor for nitricoxide synthetase and mitochondrial NADH-CoQ reductase.

Many enzymes that are key to several oxidation pathways such as alcohol oxidation, glucose oxidation, polyol oxidation and quinate oxidation rely on PQQ as their co-factor. PQQ-dependent enzymes can be categorized as sugar and alcohol dehydrogenases including several alcohol dehydrogenases (ADHs) and NAD (P)-dependent alcohol dehydrogenase, reductase and oxidase. Up till now, PQQ-dependent dehydrogenases discovered in alcohol oxidation are membrane-bound alcohol dehydrogenase, soluble alcohol dehydrogenases, membrane-bound cyclic alcohol dehydrogenase. PQQ-dependent dehydrogenases discovered in glucose oxidation are membrane-bound D-glucose gehydrogenase (m-GDH), soluble D-glucose dehydrogenase (s-GDH). PQQ-dependent dehydrogenases discovered in polyol oxidation are membrane-bound D-arabitol dehydrogenase, membrane-bound meso-erythritol oxidation dehydrogenase, membrane-bound D-gluconate oxidizing polyol dehydrogenase, membrane-bound glycerol dehydrogenase, membrane-bound D-mannitol dehydrogenase, membrane-bound ribitol dehydrogenase, membrane-bound D-sorbitol dehydrogenase, membrane-bound L-sorbosone dehydrogenase, PQQ-dependent dehydrogenases discovered in quinate oxidation is membrane-bound quinate dehydrogenase (QDH). In addition, aldehyde dehydrogenase is also PQQ-dependent.

PQQ has been proved vital to mammal development and general health. Animals rely on their diet as the source for their daily PQQ supply. Mice fed chemically defined diet devoid of PQQ that are otherwise nutritionally adequate have offspring with impaired neonatal growth and abnormal features. Adult mice are suffered from reduced fitness, impaired immune response and decreased fertility, with hunched posture, friable skin, hemorrhage and diverticuli. Once PQQ is supplied to the diet for the mice, the above mentioned malaises are disappeared (Steinberg, F. M., Gershwin, E. & Rucker, R. B. (1994) Dietary pyrroloquinoline quinone: growth and immune response in BALB/c mice. J. Nutr. 124: 744-753). More PQQ functions are observed in animal experiments. Purified PQQ is able to protect liver damage induced by $CCl_4$ or alcohol as an antioxidant and a redox agent. Purified PQQ decreases glucocorticoid (hydrocortisone) induced cataract formation in chicken embryo development, possibly by restoring glutathione levels, which are reduced in response to hydrocortisone. Purified PQQ protects neuronal cells NMDA toxicity by directly oxidizing the receptor's NMDA redox site, thereby preventing brain hypoxia and ischemia, and protecting animal model from severe stroke. Similarly, purified PQQ protects cardiac cells and prevents them from cardiac ischemia and infarct.

Research works thus far have been focused on using purified PQQ as a vitamin for diet supplements and pharmaceutical drugs. Purified PQQ have been applied to a wide variety of diseases prevention and treatment, ranging from treating Alzheimer's disease, preventing and treating osteoporosis, preventing and treating fatty liver, treating alcoholism, treating heavy metal poisoning, increasing blood zinc level while reducing lead level in children and adults to preventing development of neurological disease.

For example, US Patent Application Publication 20030229114 discloses a method of using purified PQQ for prevention and treatment of acute and chronic neurological injury caused by peroxynitrite. US Patent Application Publication 20050267143 discloses a method of using purified PQQ for treating or preventing myocardial oxidative stress, since purified PQQ modulates free radical damage.

U.S. Pat. No. 5,460,819 and Chinese Patent 00119473.9 disclose a method of using purified PQQ for treating heavy metal toxicity. Chinese Patent 03141434.6 discloses a method of using purified PQQ for increasing tissue zinc level and reducing lead level. Chinese Patent 02111549.4 discloses a method of using purified PQQ for treating alcoholism and preventing and treating fatty liver induced by alcohol.

The ubiquitous existence of PQQ in many organisms and the importance of PQQ in many biochemical pathways suggest that PQQ functions beyond a vitamin or a pharmaceutical drug, and application of PQQ can well exceed nutritional use in animals.

In accordance with one embodiment of the present invention, provided is a processed food product comprising a food portion fortified with an effective amount of purified PQQ or a compound containing effective amount of purified PQQ derivatives for preserving the food portion.

The inhibition mechanism of purified PQQ to the growth of microorganism has been studied, and the result is disclosed in Example 1 of this invention disclosure.

Food products fortified with purified PQQ have several advantages. Since purified PQQ can inhibit the growth of microorganisms in food, the shelf life of the food product is prolonged and the food is preserved. PQQ is a natural substance existing in animal and plant foods, therefore it is not harmful to human. Furthermore, purified PQQ benefits the consumer as a vitamin. Since purified PQQ is an odorless chemical compound, adding purified PQQ to foodstuff does not change the flavor or the texture of the food. Therefore, one embodiment in the present invention is adding purified PQQ to a processed foodstuff to manufacture a food product comprising a food portion fortified with an effective amount of purified PQQ or a compound containing effective amount of purified PQQ derivatives, for the purpose of providing an inhibiting means to microorganism growth in the food and preserving the food portion.

The purified PQQ inhibiting means to microorganism growth in the food includes damaging genetic materials deoxyribonucleic acids and ribonucleic acids (DNAs and RNAs) of microorganisms, thereby inhibiting replication of the microorganisms in the food product. Purified PQQ inhibiting means also includes blocking normal metabolism such as respiration of microorganisms in the food, thereby interfering life cycle of the microorganism in the food product. Research work done by Yusuke Hiraku et al indicates that low concentrations of PQQ (10 μM PQQ, equivalents to 3.3 mg/L) may induce DNA cleavage at thymine and cytosine residue sites of the DNA. The PQQ induced DNA damage is dependent on the presence of NADH and Cu (II). Possible explanation is that NADH-dependent PQQ redox cycle generated superoxide and hydrogen peroxide, which in turn mediate copper-dependent DNA damage. (NADH-mediated DNA damage induced by a new coenzyme, pyrroloquinoline quinone, in the presence of copper (II) ion FEBS Letters, Volume 393, Number 2, 16 Sep. 1996, pp. 317-320(4)). Similarly superoxide and hydrogen peroxide generated by low concentration PQQ (500 μM PQQ, equivalents to 165 mg/L) in the presence of NADH and Cu (II) may block electron transferring chain on bacteria membrane, thereby interferes normal metabolism including respiration of bacteria.

The microorganism inhibited by purified PQQ can be fungi, molds, various yeasts, spoilage and pathogenic bacteria, and certain virus. Examples of the microorganisms inhibited by purified PQQ are fungi such as *Geotrichum candidum*, molds such as *Aspergillus niger* and *Penicillium expansum*, spoilage bacteria such as *Alcaligenes faecalis, Bacillus stearothermophilus, Lactobacillus acidophilus* and *Pseudomonas fluorescens*, pathogenic bacteria such as *Bacillus cereus, Staphylococcus aureus, Listeria monocytogenes, Yersinia enterocolitica, Salmonella typhimurium, Salmonella hydelberg, Salmonella enteritidis, Escherichia coli* O157:H7, *Campylobacter jejuni, Clostridium botulinum, Clostridium perfringens, Shigella sonnei, Shigella dysenteriae, Shigella flexneri, Shigella boydii, Vibrio cholera* and *Lysteria monocytogenes*, and certain virus such as Norovirus and hepatitis virus.

The foodstuff treated by purified PQQ is ranging from solid food to all kinds of beverages. In one embodiment of the present invention, the foodstuffs fortified by purified PQQ are dairy products including milk, milk powder, infant formula milk powder, fats, oils, fat emulsions, edible ices including sherbet and sorbet, fruits, vegetables, seaweeds, nuts, seeds, confectionery including hard candy, fudge, toffee, Swiss milk tablet, chocolate, kopiko, marshmallow, marzipan, divinity, pastry, chewing gum, ice cream, halvah and alfajor, cereals, cereal products derived from cereal grains, roots, tubers, pulses and legumes, bakery wares, meat and meat products including poultry and game, fish and fish products including mollusks, crustaceans and echinoderms, eggs, egg products, sweeteners including honey, salts, spices, soups, sauces, salads, protein products including soybean protein products and fermented soybean products, ready-to-eat savourie, composite foods, beverages including fruit juice, iced tea, iced coffee, cola, ginger beer, tonic water, squash, root beer, lemonade, milkshake, cappuccino, coffee, espresso, Frappé, mocha, latte, hot chocolate, hot cider, mulled cider, Glühwein, flavored teas, green tea, pearl milk tea, tea, herbal teas, roasted grain beverages, sodas or alcoholic beverages including cocktails, ale, Scotch whisky, rye beer, Rye whisky, corn beer, Bourbon whiskey, wheat beer, Wheat whisky, Korn, sake, sonti, makkoli, tuak shochu, soju, Huangjiu, Baijiu, wine, brandy, Cognac, Branntwein, Pisco, cider, apfelwein, applejack, Calvados, lambig, pear brandy, betsa-betsa, rum, cachaca, aguardiente, guaro, mescal, plum wine, slivovitz, tzuica, palinca, pomace wine, grappa, Trester, marc, zivania, mead, mead brandy, potato beer, vodka, aquavit, brännvin, akvavit, akevitt, brennivín, Poitín, Kumis, Araka.

Purified PQQ is especially suitable for fortifying dairy products such as milk, milk powder and infant formula milk powder. Even today, pasteurizing milk destroys pathogenic bacteria only. Since spoilage bacteria are left undestroyed, pasteurized milk has a short shelf life. Purified PQQ fortification of dairy products will inhibit many kinds of microorganism growth in the products and prolong the shelf life of them. Likewise, other food and beverage products such as juice, cider, beer, eggs, honey, sports drinks and water can also be fortified with purified PQQ to inhibit microorganism growth and extend their shelf lives. The dairy product fortified with purified PQQ can be butter, cream, cottage cheese, yogurt, kefir, mozzarella cheese, fresh cheese, ripe cheese and Parmesan cheese. The milk fortified with purified PQQ can be any kind of milk such as cow's milk, buffalo's milk, goat's milk and sheep's milk. Preferably, the milk fortified with PQQ is cow's milk, including its milk powder and infant formula milk powder. And the milk supplemented with purified PQQ will mimic human milk, which has very high concentration of PQQ, benefiting the consumer both as a healthy drink and a long shelf life beverage.

Another embodiment of the invention is a method to manufacture purified PQQ fortified food products. Purified PQQ or a compound containing effective amount of purified PQQ derivatives can be soluble or emulsified. The soluble PQQ or the emulsified PQQ is blended into the food product. The concentration of purified PQQ in the final food product ranges from 0.0001 mg/L to 1,000 mg/L. Preferably, the concentration of purified PQQ ranges from 0.001 mg/L to 100 mg/L. The final purified PQQ concentration from a compound containing effective amount of PQQ derivatives in the food product ranges from 0.0001 mg/L to 1,000 mg/L. Preferably, the concentration of purified PQQ ranges from 0.001 mg/L to 100 mg/L.

Yet another embodiment in present invention is preparing purified PQQ comprising the steps of cultivating a strain of bacteria in a culture medium, inducing bacteria mutation to obtain mutant bacteria strains, collecting supernatant of the culture medium, isolating PQQ from the supernatant by chromatography, purifying PQQ and crystallizing PQQ.

Detailed procedure to manufacture purified PQQ in large-scale production is disclosed in the following.

Two kinds culture media are prepared for culturing microorganism strains producing purified PQQ. Liquid culture media is prepared for shake flask culture. Solid culture media is prepared for Petri dish culture. The culture media are supplied with elements tyrosine, glutamine, and Tween 80 to increase synthesis yield of PQQ from culturing the microorganisms. Further, the culture media is supplied with additional carbon source such as methanol, sodium acetate, glycerol and D-mannitol to increase synthesis yield of PQQ from culturing microorganisms. Preferably, methanol is the optimal carbon source added to culture media.

Microorganism strains *Hyphomicrobium* strains (ATCC No: 27500, ATCC No: 27501, ATCC No: 33404), *Methylophage thalassica* strain (ATCC No: BAA-297), *Thiobacillus* (ATCC No: 8093) strain are selected for culturing and mutating experiments. The strains have been deposited in American Type Culture Collection (ATCC), a nonprofit organization in Virginia, USA (http)://www.atcc.org/About/AboutATCC.com), and their correspondent registration numbers (ATCC Numbers) are listed above. Original bacteria strain samples 1 ml from each strain are cultured in 100 ml liquid culture media, 30 degree C., 120 revolution/min (rev/min) for 24 hours in shake flasks to increase their volume, then 0.5 ml of each of the cultured bacteria strains are transferred to Petri dish to be induced under ultraviolet (UV) light from the source of a 20-Watt UV lamp in a DL-CJ-2N High Performance Super-clean Bench. Pour plate method (Mixing bacteria method) are used and colony forming units (CFU) are counted to examine the result of the cultivation. Pour plate method, colony forming units (CFU) method, UV light induction and lethal rate calculations are further disclosed in detail in Example 2 of this invention. UV light exposure damages the genetic materials of microorganisms and induces mutant strains. When a molecule is exposed under UV light and absorbs certain amount of energy from the UV light, the molecule is excited, with some of its electrons are elevated to higher energy level, causing mutation of the molecule. DNA (deoxyribonucleic acid) molecule is able to absorb large amount of UV light, therefore it is very easily to mutate under UV light, and changes its molecular structure. The molecular structure changes include breaking of DNA chain, cross linking within DNA molecule and inter DNA molecules, cross linking between nucleic acids and proteins, and forming of hydrated pyrimidine and pyrimidine dimmer. Pyrimidine dimmer formation is a major cause for DNA molecular structure change and genetic mutation of bacteria. Thus high PQQ yield bacteria strain is obtained by UV light induced mutation. The mechanism of UV light induced mutagenesis is well known to those skilled in the art.

After UV light inducing, the cultured microorganisms undergo a 75% lethal rate selection. Lethal rate describes the ratio of the number of dead bacteria caused by UV light induction versus the number of total bacteria in liquid culture media. Lethal rate of bacteria exposed under UV light varies since the sensitivities to UV light mutation of different bacteria strains at different growing stages vary greatly. Experiment results indicate that bacteria mutation is not satisfactory if low lethal rate (less than 70%) is used, and high PQQ yield bacteria strains are difficult to be selected at those rates. High PQQ yield bacteria strain is also difficult to be selected if high lethal rate (more than 80%) is used since the number of live bacteria in the liquid culture media is reduced greatly and too many lethal mutant bacteria no longer survive the screen because they are over exposed under UV light. Therefore, relatively low lethal rate (lethal rate from 70% to 80%) will be used to select high PQQ yield mutant bacteria strains. In the disclosed invention, 75% lethal rate selection is employed, which is 75% of bacteria are dead after UV light exposure, roughly speaking. According to experiment results, when *Hyphomicrobium* strains are exposed under UV light for 2 minutes 75% lethal rate is achieved. When *Methylophage thalassica* strain is exposed for 2.5 minutes 75% lethal rate is achieved. When *Thiobacillus* strain is exposed for 1.5 minutes 75% lethal rate is achieved.

Mutant strain selection with high PQQ yield is described as the following. Two hundred mutant microorganism strains selected from above 75% lethal rate method are cultured under dark condition in liquid culture media simultaneously, and PQQ yield from each of the bacteria strain is calculated. The 10 mutant microorganism strains with high PQQ yield are selected, and they are cultivated for next 10 generations in shake flasks. Thus a mutant microorganism strain stably producing PQQ with highest PQQ yield is selected.

Another mutation inducing method is ion beam induction and selection. Bacteria strains are spread onto Petri dishes, and nitrogen ion beams at energy level of 20 keV are used for impulsive injection. Ion beam exposure damages the genetic materials of microorganisms and induces mutant strains. Specifically, bacteria exposed to ion beam undergo mutagenesis such as chromosome aberration, damaging and breaking of the four bases from DNA molecule, causing genetic material change and loss at molecular level, and creating large numbers of mutant strains for the purpose of selecting high PQQ yield bacteria strains. The mechanism of ion beam induced mutation is well known to those skilled in the art. Detailed steps of ion beam induction and selection are disclosed in Example 2.

Mutant strain selection with high PQQ yield is described as the following. After ion beam injection, 100 bacteria strains mutated by ion beam inducing method are cultured in liquid culture media simultaneously, and PQQ yield from each of the bacteria strain is calculated. Ten bacteria strains with high PQQ yield are selected, and they are cultivated for next 6 generations in shake flasks. Finally a bacteria strain stably producing PQQ with highest PQQ yield is selected.

The mutant microorganism strains produced after UV light mutation and ion beam mutation are U-H103, U-MT12, U-T187, E-H177, E-MT145 and E-T128. The mutant strain U-H103, which is mutated from *Hyphomicrobium*, is deposited in China Center for Type Culture Collection in Wuhan, China (CCTCC, http://www.cctcc.org/), and its registration number is CCTCC No: M 208013. The mutant bacteria strains differ from their original strains on cell morphology and colony morphology. Mutant *Hyphomicrobium* strains are rod shape, gram-negative cells. They form white colonies, which change to beige or yellow coloration in older colonies on solid culture media. They are turbid in liquid culture media, and stick onto the wall of culture flasks easily. U-H103 and E-H177 are mutants from *Hyphomicrobium* strains, their colonies are larger than *Hyphomicrobium* strains, and are slightly dry with yellowish color. U-H103 and E-H177 can be further distinguished according to the difference of the amount of their PQQ production. Mutant *Methylophage thalassica* strains are rod shape, gram-negative cells. They form yellow colonies, and are dry on solid culture media. When they are cultured in liquid culture media they are apparently turbid and easily precipitated. U-MT12 and E-MT145 are mutant strains from *Methylophage thalassica*, their colonies are larger than *Methylophage thalassica* strain. U-MT12 and E-MT145 can be further distinguished according to the difference of the amount of their PQQ production. Mutant *Thiobacillus* strains are short rod shape, gram-negative cells.

They form colorless and moist colonies on solid culture media. When they are cultured in liquid culture media they are easily forming membrane or film shapes. U-T187 and E-T128 are mutant strains from *Thiobacillus* strain, slightly white and slightly dry colonies on solid culture media. U-T187 and E-T128 can be further distinguished according to the difference of the amount of their PQQ production. Mutant bacteria strains produced according to the process disclosed above have high and stable PQQ yield. The method is reproducible and suitable for large scale manufacturing PQQ.

After culturing microorganisms and producing PQQ, a process of isolating, purifying and crystallizing PQQ is necessary. In this invention the following steps are disclosed to illustrate the process of filtrating, centrifuging, running through DEAE column chromatography, ultrafiltrating, acid precipitating and crystallizing in order to purify and crystallize PQQ as an example.

The supernatant containing synthesized PQQ from microorganism culture (fermentation) is prepared through centrifugation of fermenting liquid that is collected from lower fermentation pot, and is stored in 4-10 degree C. cold storage. The collected volume of the fermenting liquid is recorded, bacteria density (OD600 numbers) and PQQ yield in the liquid is examined. The collected fermenting liquid is centrifuged in a large volume, high speed, and refrigerated centrifuge. Supernatant is collected after centrifugation.

The supernatant is then filtered through 1.2 μM micro filter membrane to reduce bio-load, such as debris of microorganisms and large molecules. The following experiments are performed at temperature 20-22 degree C. DEAE (Diethylaminoethyl)-Streamline anion exchange column chromatography is used to eliminate large amount of unwanted impurity from filtered supernatant at pH 7.0-8.0. DEAE column for DEAE column chromatography is prepared with DEAE-Streamline material (from Amersham Bioscience) and pre-balanced with Balancing solution A and Balancing solution B. The supernatant sample containing PQQ from centrifuged fermenting liquid is adjusted to electrical conductance 400-500 μs/cm, pH7.0-8.0 by distilled water. Then the supernatant sample is added onto the top of the DEAE column. The column flow rate is adjusted to 25 ml/minute. The DEAE column is washed after the supernatant sample is added by Washing solution A and Washing solution B at the flow rate of 25 ml/minute, until washing solution brings PQQ band (which has brown-red color) down to the lower ¼ column part. PQQ band is eluted by Eluting solution, and the brown-red PQQ band moves down towards the bottom of the column. From the start of PQQ exiting the column, collecting eluted PQQ solution until brown-red color disappears from the column. The volume of eluted solution with PQQ is recorded. The content of PQQ in the eluted solution is tested. The efficacy of DEAE column is calculated. After the elution, the column is washed with Washing solution and distilled water at the flow rate of 25 ml/minute to regenerate the column.

Acid precipitation and crystallization for PQQ purification is performed to get purified PQQ. The isoelectric point of target product PQQ is pH 2.75. At 20-25 degree C., in pH 7.0 water solution, the solubility of PQQ is 1-2 mg/ml. The solubility of PQQ will be lowered if the temperature and pH values of the solution are reduced gradually. Large amount of PQQ will be precipitated if the solution is adjusted to pH 2.75, and 98% of PQQ will be crystallized if the temperature of the solution is further reduced to 2-8 degree C. Therefore, acid precipitation and low temperature crystallization is used for PQQ purification. Detailed steps are described as following:

Isolated PQQ solution collected from DEAE column is adjusted to pH 2.75 with 2N HCl. Then the PQQ solution at pH 2.75 is put in a 2-8 degree C. refrigerator for 5-7 days until PQQ is crystallized completely. All the instruments used in following steps are pre-washed with pH 2.75 HCl water solution cooled to 2-8 degree C., and kept at 2-8 degree C. before use. The solution containing acid precipitated and crystallized PQQ is centrifuged in a large volume, high speed, refrigerated centrifuge (HITACHI CR22E high speed refrigerated centrifuge). Purified PQQ is collected after centrifugation. Collected PQQ is stirred and washed in pH 2.75 HCl water solution pre-cooled to 2-8 degree C. After washing, PQQ is centrifuged again in a centrifuge. This step can be repeated several times to get pure PQQ. Final product PQQ is collected after centrifugation. PQQ sample is tested for PQQ concentration and purity. Final product PQQ is kept in a negative 80 degree C. freezer for pre freezing. Brown-red frozen PQQ power is obtained from a freezing machine.

The above described technique produces at least 85% pure PQQ. However, if the above technique is further optimized, better than 98% pure PQQ is produced.

In order to eliminate impurities and obtain pure PQQ powder, Ultrafiltration Cassettes is employed to optimize PQQ purification techniques. The eluted PQQ solution from DEAE column is further filtered through 8K Ultrafiltration Cassette (from Milipore™), Ultrafiltration system (Centramate™) Tangential Flow Filtration System (from Pall Co.) before isoelectric point precipitation (acid precipitation) step. The ultrafiltrating results indicate that using 8 K Ultrafiltration Cassette to eliminate impurity proteins in eluted PQQ solution will produce 98% pure or better PQQ in the following steps of isoelectric point precipitation (acid precipitation) and crystallization (low temperature crystallization).

The alternative way to eliminate impurity proteins is ultrafiltrating the supernatant of fermentation liquid before isolating PQQ through DEAE (Diethylaminoethyl) column chromatography, using the same Ultrafiltration Cassettes. The same purity of 98% PQQ powder is also produced this way.

EXAMPLES

The invention will be further described in the following examples, which do not limit the scope of the invention described in the claims.

Example 1

PQQ Inhibiting Microorganism Growth in Food

The effects of purified PQQ inhibition of the growth of microorganism and its application in extending food shelf life have been demonstrated experimentally.

In one experiment, Top 10 *E. coli* and Ampicillin resistant (AmpR) *E. coli* are selected as bacterial samples. These bacterial samples are cultured separately in LB media in a number of tubes with various purified PQQ concentrations. LB media is prepared as following: Ten gram Bacto-tryptone, 5 g yeast extract and 10 g NaCl are added to 800 ml distilled $H_2O$. The pH of the solution is adjusted to 7.5 with NaOH, and the final volume is adjusted to 1 L with distilled $H_2O$. The LB media is autoclaved and filtered to be sterilized. The PQQ concentration range is prepared between 0 to 100 mg/Liter of LB media in the number of the tubes. The bacterial samples are inoculated into the tubes to the amount of $1 \times 10^5$/tube, incubated in 37 degree C. on shaking bench for designated time according to the following experiment designs. It is known that Ampicillin has no effect to the growth of Ampicillin resistant *E. coli* but can inhibit other bacteria growth. Therefore, the data from the Ampicillin experiment are focused on AmpR *E. coli* growth. While in the case of Top10 *E. coli*, other types of bacteria may grow in the culture as well.

Figure 1A:
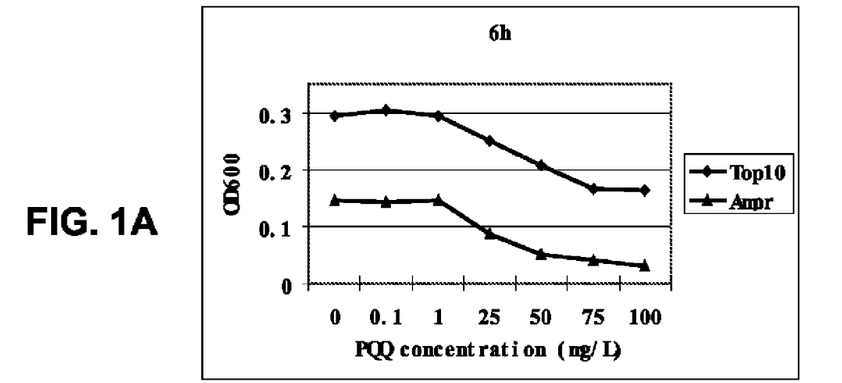
FIG. 1 shows the OD600 value as a function of PQQ concentration levels in Top10 and ampicillin resistant (AmpR) *E. coli* bacterial cultures.
Figure 1B:
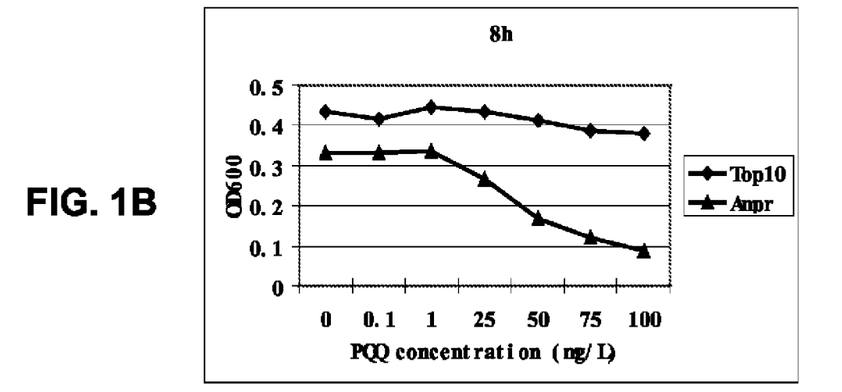
Figure 1C:
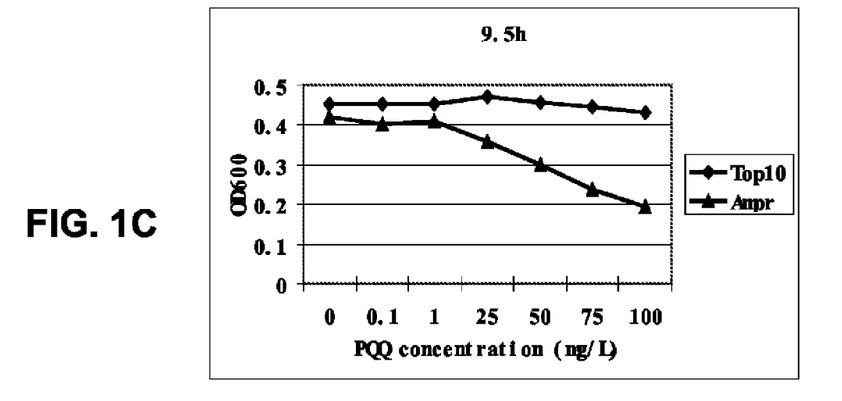

Table 1 and FIG. 1 show OD600 value of samples from Top10 *E. coli* and Ampicillin resistant *E. coli* cultured at 6, 8, and 9.5 hours. OD600 is a measurement of the optical density at 600 nm wavelength light of a liquid media. The optical density is related to the amount of particle scattering of light. In this case, a high optical density indicates a large number of bacteria in the cultural sample, and OD600 datas are used in this invention disclosure as indication of numbers of bacteria in the liquid media, which is a standard method to monitor microorganism growth. The OD600 of cultured microorganism in liquid media is measured by photometer, using blank media as blank reference. To convert OD600 to the number of microorganism such as *E. coli* in the culture media, the converting formula is 1 OD=$3.8 \times 10^8$. OD600 is a well known technique of monitoring bacterial growth to those of skilled in the art and so is not discussed further here.

TABLE 1

OD600 MEASUREMENT

| PQQ | 6 Hours | | 8 Hours | | 9.5 Hours | |
|---|---|---|---|---|---|---|
| (mg/L) | Top10 | AmpR | Top10 | AmpR | Top10 | AmpR |
| 0 | 0.294 | 0.145 | 0.433 | 0.331 | 0.451 | 0.421 |
| 0.1 | 0.303 | 0.143 | 0.416 | 0.331 | 0.451 | 0.401 |
| 1 | 0.293 | 0.145 | 0.445 | 0.335 | 0.452 | 0.408 |
| 25 | 0.251 | 0.087 | 0.433 | 0.268 | 0.472 | 0.356 |
| 50 | 0.208 | 0.052 | 0.413 | 0.169 | 0.457 | 0.298 |
| 75 | 0.165 | 0.04 | 0.386 | 0.122 | 0.446 | 0.239 |
| 100 | 0.163 | 0.03 | 0.378 | 0.088 | 0.431 | 0.192 |
| Amp/kana | 0.007 | 0.006 | 0.01 | 0 | 0.013 | 0.006 |

The data shown in FIG. 1 and table 1 indicate a general trend that the number of *E. coli* in AmpR sample decreases as the concentration of purified PQQ increases. This experiment demonstrates that the growth of *E. coli* bacteria can be inhibited by purified PQQ. It is also speculated that the inhibition effect of purified PQQ to bacterial growth is most efficient during the growth stage instead of the saturation stage.

In one embodiment of the present invention, the inhibition effect of purified PQQ to the growth of bacterial is utilized to preserve food products. The food preserving method has been tested and proved by an experiment in which purified PQQ is added in and blended with non-pasteurized cow milk. The samples were prepared with purified PQQ concentration level of 0, 0.1, 1, and 10 mg/L. Next, the samples were shaken at 37 degree C. for 3, 6, and 9 hours, and then saved in a refrigerator under 4 degree C. On the next day, liquid culture media LB was added into the samples, followed by the samples cultured in shake flask for the next 24 hours and ready for OD600 test.

Figure 2:
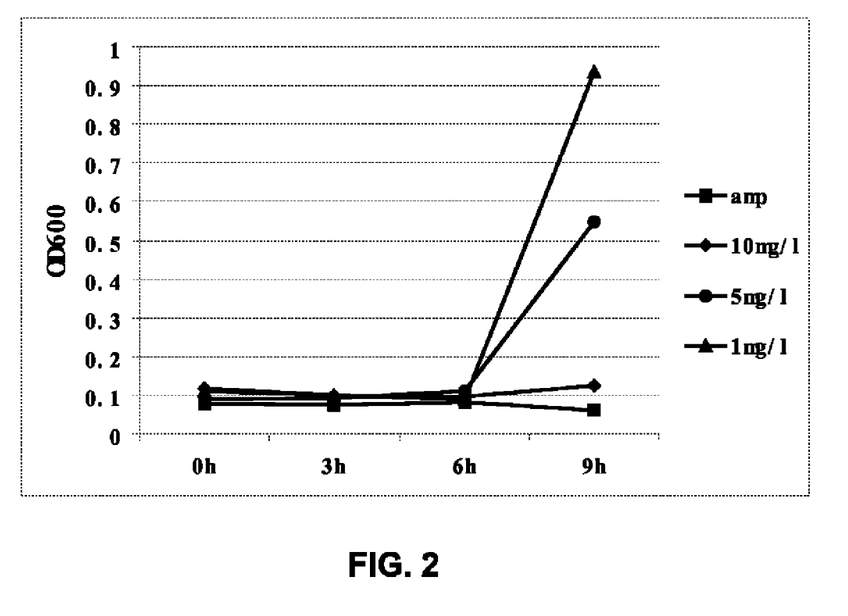
FIG. 2 shows the OD600 value as a function of PQQ concentration levels measured from PQQ fortified milk.

FIG. 2 presents the OD600 value as a function of purified PQQ concentration measured from the samples shake flask for 3, 6, and 9 hours. The data clearly show that, after 6 and 9 hour mixing, the amount of bacteria decreases as the purified PQQ concentration increases, indicating the inhibition effect of purified PQQ to the growth of bacteria.

Example 2

Production of PQQ

In accordance with one embodiment of the present invention, provided is an manufacture method for large scale production of purified and crystallized PQQ through low cost and high throughput culturing microorganism method. There are two importance aspects to achieve highly purified PQQ. One relates to selecting suitable bacteria in order to produce PQQ efficiently, which will be described in Part 1. Another is about novel method to purify and crystallize PQQ for optimized applications. This aspect will be described in Part 2.

Part 1 Cultivating Microorganisms and Synthesizing of PQQ

The following description explains a procedure of cultivating microorganism strains in order to synthesize PQQ as an example.

The following describe preparing culture media including liquid culture media and solid culture media.

In 1 liter distilled water add 3 gram (g) $(NH_4)_2SO_4$, 1.4 g $KH_2PO_4$, 3 g $Na_2HPO_4$, 0.1 g $MgSO_4$, 8 g Methanol, 100 μg Fe, and 1 ml trace element stock solution, stir well and store in 2-4 degree C. The liquid culture media is prepared.

Trace element stock solution is prepared as described in next paragraph.

In 1 Liter culture media add 0.1 g $ZnSO_4.7H_2O$, 0.1 g $CaCl_2.2H_2O$, 0.01 g NaCl, 0.005 g $CuSO_4.5H_2O$, 0.005 g $MnSO4.3\ H_2O$, 0.001 g H3BO3, and 0.05 g KI, stir well and store in 2-4 degree C. and trace element stock solution is prepared.

Solid culture media is prepared as described in next paragraph.

Add 2% agar to liquid culture media according to the volume in need, stir well and store in 2-4 degree C. and solid culture media is prepared.

The following describe preparing bacteria strains, cultured bacteria solution and suspended bacteria solution.

*Hyphomicrobium* strains (ATCC No: 27500, ATCC No: 27501, ATCC No: 33404), *methylophage thalassica* strain (ATCC No: BAA-297), and *Thiobacillus* strain (ATCC No: 8093) are the bacteria strains used for producing PQQ.

One ml bacteria strain described above is added into 100 ml liquid culture media, cultivated at 30 degree C., 120 rev/min for 24 hours, and the cultured bacteria solution is prepared. One ml of the cultured bacteria solution is diluted with Pour plate method (Mixing bacteria method) and colony forming units (CFU) was counted, and cultured bacteria solution are prepared. Pour plate method and colony forming units (CFU) method are performed as the following: (All the procedures are performed at aseptic condition.) Cultured bacteria strains 0.5 ml each is transferred through an aseptic graduated pipette into 4.5 ml PBS (pH=7.0) to get concentration of $10^{-1}$ diluted bacteria strain sample, and the above process is repeated to prepare diluted bacteria strain samples with concentration from $10^{-1}$ to $10^{-8}$. Three test tubes each has 1 ml of diluted bacteria strain samples with concentrations of $10^{-8}$, $10^{-7}$ and $10^{-6}$, are inoculated into 9 Petri dishes, with each concentration of the samples is inoculated into 3 Petri dishes. Solid culture media cooled to 50 degree C. is poured into the Petri dishes up to 1.5 to 2 mm from the bottom of the Petri dishes. Immediately mix the diluted bacteria strain samples and solid culture media by shacking the dishes gently and carefully until the samples and the solid culture media are well mixed and the solid culture media are solidified, with no sample spilled over the dishes. Bacteria colonies of each of the Petri dish are counted after the dishes are incubated for 48 hours. Petri dishes having bacteria colony number from 30 to 300 are selected and the average numbers of colonies of diluted bacteria strain samples are calculated. Each average number is timed by concentration, and the total colony numbers are calculated.

Five ml cultured bacteria solution is added into a Petri dish filled with 45 ml Phosphate Buffered Saline (PBS). The suspended bacteria solution is prepared.

PBS is prepared as following: Eight gram NaCl, 0.2 g KCl, 1.44 g $Na_2HPO_4$ and 0.24 g $KH_2PO_4$ are dissolved in 800 ml distilled water and the pH of the solution is adjusted to 7.4 with HCl, adding distilled water to final volume of 1 Liter.

Next, ultraviolet (UV) inducing bacteria mutation followed by 75% lethal rate selecting mutant strain are performed. UV inducing bacteria mutation is described as following. Petri dish filled with suspended bacteria solution as described in previous step is put on a magnetic stirrer. The Petri dish is kept 30 cm under a UV lamp tube of a 20-Watt UV lamp in a DL-CJ-2N High Performance Super-clean Bench. The UV lamp is turned on, the Petri dish is open and the magnetic stirrer is turned on, allowing the bacteria exposed to UV light evenly. The following procedures are performed under light free experiment condition. Bacteria samples 1 ml are taken 6 times during the UV exposure time at 0.5 minutes, 1 minutes, 1.5 minutes, 2.0 minutes, 2.5 minutes and 3 minutes, and the samples are kept in a refrigerator for 1-2 hour under light free condition. Colony forming units (CFU) of each sample is counted again with Pour plate method (Mixing bacteria method) by using the same CFU procedures disclosed above.

The lethal rates of the bacteria are calculated, and 75% lethal rate of the bacteria is obtained as the formula: Lethal Rate=(Total number of bacteria colony before induction–Number of live bacteria colony after induction)/Total number of bacteria colony before induction×100%. Select the bacteria samples with 75% lethal rate for further experiment steps.

Mutant strain selection with high PQQ yield is described as the following. Two hundred bacteria strains selected from above 75% lethal rate method are cultured in liquid culture media simultaneously, in 30 degree C., 200 rev/min for 7 days. PQQ yield from each of the bacteria strain is calculated. The 10 bacteria strains with high PQQ yield are selected, and they are cultivated for next 10 generations in shake flasks. A bacteria strain stably producing PQQ with highest PQQ yield is selected.

Ion beam inducing bacteria mutation is described as following. Bacteria strains are spread onto Petri dishes, and the Petri dishes are put on a water-cooled target plate inside a microenvironment target chamber. When the microenvironment target chamber is pre-pumped to 100 Pa, main isolating valve is opened. Nitrogen ion beam at energy level of 20 keV is injected into main vacuum chamber impulsively at the condition of 1023 Pa vacuum. The width of the nitrogen ion beam impulses is 5 seconds, with 55 seconds between the impulses. Total amount of the ion beam injection is $0.52 \times 10^{15}$ ions/cm$^2$. The Petri dishes are taken out of the chamber after the total amount of ion beam is injected. The bacteria in the Petri dishes are washed and collected with 1 ml microorganism free water. The suspended bacteria solutions are prepared with microorganism free water, which are further diluted to several suspended bacteria solutions with various concentrations. Each of the suspended bacteria solutions with different concentrations are spread onto corresponding Petri dishes, and cultured at 30 degree C. for 7 days, for the purpose of selecting Colony forming units (CFU) of mutant bacteria strains, using the same procedures of CFU are disclosed above.

Mutant strain selection with high PQQ yield is performed after ion beam induction. One hundred bacteria strains mutated by ion beam inducing method are cultured in liquid culture media simultaneously, in 30 degree C., 200 rev/min for 7 days. PQQ yield from each of the bacteria strain is calculated. The 10 bacteria strains with high PQQ yield are selected, and they are cultivated for next 6 generations in shake flasks. A bacteria strain stably producing PQQ with highest PQQ yield is selected.

Mutant bacteria strains U-H103, U-MT12 and U-T187 are induced under UV light from *Hyphomicrobium* strains, *methylophage thalassica* strain or *Thiobacillus* strain, and then selected according to 75% lethal rate described above.

Mutant bacteria strains E-H177, E-MT145 and E-T128 are induced under ion beam, and then selected according to 75% lethal rate described above.

Various microorganisms are cultured and PQQ synthesized by them are tested. *Hyphomicrobium* ATCC No: 27501, ATCC No: 27500, ATCC No: 33404, Mutant strains U-H103 (CCTCC No: M 208013), E-H177, *methylophage thalassica*, ATCC No: BAA-297, U-MT12, E-MT145, *Thiobacillus* ATCC No: 8093, U-T187, E-T128 are cultured in 50 ml culture media in 250 ml shake flasks in 30 degree C., pH 7, 200 rev/min for 7 days. OD600 and PQQ yield are examined. The mutant strain U-H103, which is mutated from *Hyphomicrobium*, is deposited in China Center for Type Culture Collection in Wuhan, China on Jan. 17, 2008 (CCTCC, http://www.cctcc.org/), and its registration number is CCTCC No: M 208013.

The results are summarized in following table 2:

TABLE 2

| OD600 MEASUREMENT and PQQ YIELD | | |
|---|---|---|
| Mutant Strain | $OD_{600}$ | PQQ (μg/ml) |
| *Hyphomicrobium* ATCC No: 27501 | 1.9 | 4.3 |
| *Hyphomicrobium* ATCC No: 27500 | 1.5 | 4.5 |
| *Hyphomicrobium* ATCC No: 33404 | 1.7 | 4.2 |
| U-H103 CCTCC No: M 208013 | 2.3 | 6.3 |
| E-H177 | 3.1 | 8.2 |
| *methylophage thalassica* ATCC No: BAA-297 | 1.4 | 3.2 |
| U-MT12 | 1.9 | 5.6 |
| E-MT145 | 2.2 | 6.4 |
| *Thiobacillus* ATCC No: 8093 | 1.9 | 5.3 |
| U-T187 | 2.4 | 6.7 |
| E-T128 | 3.2 | 9.3 |

In order to optimize PQQ yield, the following 3 experiments (Precursor experiment, Carbon source experiment and Tween Experiment) are conducted to find out chemical elements supplied to culture media to benefit PQQ synthesis, and the results are show in table 3 through table 5:

Precursor experiment is conducted as following. The precursor of PQQ is tyrosine and glutamine. Adding precursors of the final product to bio fermentation usually will increase the productivity of the final product.

In this experiment, bacteria strain *Thiobacillus* is cultured in 50 ml liquid culture media supplied with tyrosine and/or glutamine in various concentration (W/V: % weight of tyrosine or glutamine in volume of liquid culture media, shown in the following table 3) in 250 ml shake flasks at 30 degree C., pH 7, 200 rev/min for 7 days, then OD600 and PQQ yield are examined.

The result of precursor experiment is shown in Table 3:

TABLE 3

| OD600 MEASUREMENT and PQQ YIELD | | |
|---|---|---|
| | $OD_{600}$ | PQQ (μg/ml) |
| Tyrosine (1‰, W/V) | 0.9 | 2.3 |
| Tyrosine (0.1‰, W/V) | 2.2 | 7.8 |
| Tyrosine (0.01‰, W/V) | 1.8 | 6.1 |
| Glutamine (1‰, W/V) | 1.1 | 2.1 |

TABLE 3-continued

OD600 MEASUREMENT and PQQ YIELD

| | $OD_{600}$ | PQQ (µg/ml) |
|---|---|---|
| Glutamine (0.1‰, W/V) | 2.3 | 7.4 |
| Glutamine (0.01‰, W/V) | 1.7 | 5.8 |
| Tyrosine (1‰, W/V) + Glutamine (1‰, W/V) | 0.8 | 1.8 |
| Tyrosine (0.1‰, W/V) + Glutamine (0.1‰, W/V) | 2.6 | 11.2 |
| Tyrosine (0.01‰, W/V) + Glutamine (0.01‰, W/V) | 1.8 | 5.9 |

Precursor experiment indicates that adding precursor tyrosine and glutamine at concentration 0.1% weight/volume (W/V) to the culture media obviously increases both the growth of the bacteria and the PQQ yield.

Carbon source experiment is conducted as following. Bacteria strains *Hyphomicrobium Methylophage thalassica Thiobacillus* are used in this experiment according to table 4. Each bacteria strain is cultured in 50 ml liquid culture media supplied with methanol, ethanol, acetaldehyde, sodium acetate, D-glucose, glycerol, D-fructose, D-mannitol, lactose, saccharose or D-galactose as different carbon sources, in 250 ml shake flasks at 30 degree C., pH 7, 200 rev/min for 7 days. The carbon source experiment is summarized in table 4, which indicates that different bacteria strains listed in Table 4 under different carbon source condition the yield of PQQ varies substantially.

TABLE 4

PQQ YIELD and DIFFERENT CARBON SOURCE

| | Bacteria strain | | |
|---|---|---|---|
| Carbon Source | *Hyphomicrobium* ATCC No: 27501 | *Methylophage thalassica* ATCC No: BAA-297 | *Thiobacillus* ATCC No: 8093 |
| Methanol | 4.2 | 3.2 | 5.3 |
| Ethanol | —* | —* | —* |
| Acetaldehyde | —* | —* | —* |
| Sodium acetate | 3.1 | 3.5 | 3.8 |
| D-Glucose | —* | 1.2 | —* |
| Glycerol | 3.5 | 3.1 | 3.9 |
| D-Fructose | —* | —* | —* |
| D-Mannitol | 1.3 | 2.4 | 2.5 |
| Lactose | —* | —* | —* |
| Saccharose | —* | —* | —* |
| D-Galactose | —* | —* | —* |

(Numbers in table 4 are PQQ yield corresponding to bacteria strain and carbon source, the unit for PQQ yield is µg/ml, —* is PQQ <1 µg/ml)

Tween Experiment is conducted as following. Surfactant (surface-active agent) Tween 80 is a heat resisting, water-soluble fatty acid. It is able to reduce the surface tension between microorganism's body and culture media surface, stimulates the microorganism and increases many kinds of enzyme to be excreted from the microorganism's body, and change permeability of bio-membrane of the microorganism, thereby facilitating nutrients entering the microorganism and metabolic waste excreting from the microorganism.

TABLE 5

PQQ YIELD and TWEEN 80

| | PQQ (µg/ml) | | |
|---|---|---|---|
| Tween80 concentration | *Hyphomicrobium* ATCC No: 27501 | *Methylophage thalassica* ATCC No: BAA-297 | *Thiobacillus* ATCC No: 8093 |
| 1‰, V/V | 5.7 | 4.8 | 7.2 |
| 0.1‰, V/V | 4.0 | 3.5 | 6.1 |
| 0.01‰, V/V | 4.1 | 3.0 | 5.1 |

The result of Tween experiment indicates that adding Tween 80 to culture media increases PQQ yield, especially at the concentration of 1% Tween 80.

Large scale PQQ production is tested in following experiments 1 through 6 to prove the feasibility of the method in large scale manufacturing.

Liquid cultural media and procedures for large scale manufacturing PQQ are disclosed as following: In 1 liter distilled water add 3 gram (g) $(NH_4)_2SO_4$, 4.5 g $KH_2PO_4$, 1 g $MgSO_4$, 8 g Methanol, 100 µg Fe, and 1 ml trace element stock solution. Trace element stock solution is prepared same as previous method. Bacteria are cultured in 50 L fermentation pots at 30 degree C., pH 7 (pH is adjusted with adding $NH_4OH$ to the pot, if it is needed.) and 8% Methanol (w/w) for 7 days.

Experiment 1

Mutant *Hyphomicrobium* is cultured in 30 L liquid culture media in 50 L fermentation pot according to the method described in Part 1, Example 2, at 30 degree C., pH 7 for 7 days. The resultant PQQ yield is 103 µg/ml.

Experiment 2

Mutant *Methylophage thalassica* is cultured in 30 L liquid culture media in 50 L fermentation pot according to the method described in Part 1, Example 2, at 30 degree C., pH 7 for 7 days. The resultant PQQ yield is 87 µg/ml.

Experiment 3

Mutant *Thiobacillus* is cultured in 30 L liquid culture media in 50 L fermentation pot according to the method described in Part 1, Example 2, at 30 degree C., pH 7 for 7 days. The resultant PQQ yield is 133 µg/ml.

Experiment 4

Same bacteria strain and same culture condition as Example 1 are used in this experiment, plus adding Tyrosine (0.1% W/V), Glutamine (0.1% W/V), and Tween80 (1% V/V) to the 50 L fermentation pot before starting to culture the bacteria. The resultant PQQ yield is 163 µg/ml.

Experiment 5

Same bacteria strain and same culture condition as Example 2 are used in this experiment, plus adding Tyrosine (0.1% W/V), Glutamine (0.1% W/V), and Tween80 (1% V/V) to the 50 L fermentation pot before starting to culture the bacteria. The resultant PQQ yield is 143 µg/ml.

Experiment 6

Same bacteria strain and same culture condition as Example 3 are used in this experiment, plus adding Tyrosine (0.1% W/V), Glutamine (0.1% W/V), and Tween80 (1% V/V) to the 50 L fermentation pot before starting to culture the bacteria. The resultant PQQ yield is 250 µg/ml.

Part 2 PQQ Purification

The following description explains a procedure of filtrating, centrifuging, running through DEAE column chromatography, ultrafiltrating, acid precipitating and crystallizing in order to purify and crystallize PQQ as an example.

1) Preparing Supernatant of Fermentation (Microorganism Culture)

Collecting fermenting liquid is described as following. Fermenting liquid that contains synthesized PQQ from microorganism culture (fermentation) according to Part 1, Example 2 is collected from lower fermentation pot, and is stored in 4-10 degree C. cold storage for next centrifugation step. (The liquid must be centrifuged in 30 minutes after collection.) The collected volume of the fermenting liquid is recorded, bacteria density (OD600 numbers) and PQQ yield in the liquid is examined.

Centrifugation fermenting liquid and collecting supernatant of fermenting liquid is described as following. The collected fermenting liquid is centrifuged in a large volume, high speed, refrigerated centrifuge (HITACHI CR22E™ high speed refrigerated centrifuge) at 8000 rpm, 10 degree C. for 15 minutes. Supernatant is collected after centrifugation.

Filtrating supernatant is described as following. The supernatant is filtered through 1.2 µM micro filter membrane to reduce bio-load, such as debris of microorganisms and large molecules.

2) PQQ Purification through DEAE (Diethylaminoethyl) Column Chromatography

The following experiments are performed at temperature 20-22 degree C. The isoelectric point of target product PQQ is pH 2.75. DEAE (Diethylaminoethyl)-Streamline anion exchange column chromatography is used to eliminate large amount of unwanted impurity from filtered supernatant, which still has impurity proteins and nucleic acids with diverse physical and chemical characteristics. According to test experiment result, pH 7.0-8.0 is the right condition for isolating PQQ through column chromatography.

For example, after centrifugation, the process to isolate PQQ from 4.5-5.0 L of fermenting supernatant containing PQQ is described as following steps:

Step 1: Preparing and Treating DEAE Column for DEAE Column Chromatography.

DEAE-Streamline material (from Amersham Bioscience) 400 ml is used to fill a size Φ5.0 cm×height 30 cm DEAE column according to Amersham Bioscience's manual. Distilled water is used to wash the column 3 CV (Column Volume, which is DEAE column measured from the bottom of the column to DEAE surface of the column.), the flow rate of the water is 25 ml/minute.

Step 2: Balancing DEAE Column for DEAE Column Chromatography.

Preparing Balancing solution A: 0.1M Tris, pH8.00; 2 L and Balancing solution B: 20 mM Tris, pH8.00; 5 L DEAE column is balanced by Balancing solution A 5 CV, the flow rate of the balancing solution is 25 ml/minute. Then DEAE column is balanced by Balancing solution B 10 CV, the flow rate of the balancing solution is 25 ml/minute, until balancing solution exiting the column has the same electrical conductance and pH as that of balancing solution B.

Step 3: Adding Sample to DEAE Column

The supernatant sample containing PQQ from centrifuged fermenting liquid 4.5-5.0 L is adjusted to electrical conductance 400-500 µs/cm, pH7.0-8.0 by using distilled water. Then the supernatant sample is added onto the top of the DEAE column. The column flow rate is adjusted to 25 ml/minute.

Step 4: Washing the DEAE Column

DEAE column is washed after the supernatant sample is added by Washing solution A: 20 mM Tris, pH8.00, 1 L, 1-2 CV at the flow rate of the wash solution is 25 ml/minute, and Washing solution B: 20 mM Tris, 0.2M NaCl, pH8.00, 3 L, 5-7 CV at the flow rate of the wash solution is 25 ml/minute, until washing solution brings PQQ band (which has brown-red color) down to the lower ¼ column part.

Step 5: Eluting PQQ

Prepare Eluting solution: 20 mM Tris, 0.65M NaCl, pH 8.00, 2 L

After the column is washed, adding Eluting solution to the column and watching brown-red PQQ band moves down the column towards the bottom of the column. From the start of PQQ exiting the column, collecting eluted PQQ solution until brown-red color disappears from the column. The volume of eluted solution with PQQ is recorded. The content of PQQ in the eluted solution is tested. The efficacy of DEAE column is calculated.

Step 6: Regenerating the Column

After the elution, the column is washed with the following solutions:

Washing solution 20 mM Tris, 1.5M NaCl, pH8.00 is used to wash the column 5 CV at the flow rate of 25 ml/minute.

Distilled water is used to wash the column 5 CV at the flow rate of 25 ml/minute.

Washing solution 0.2M HCl is used to wash the column 5 CV at the flow rate of 25 ml/minute.

Distilled water is used to wash the column 5 times CV at the flow rate of 25 ml/minute.

Washing solution 0.5M NaOH is used to wash the column 5 CV at the flow rate of 25 ml/minute.

Distilled water is used to wash the column 5 CV at the flow rate of 25 ml/minute.

Step 7: Preserving the Column

Preserving solution 20% ethanol is used to wash the column 5 CV at the flow rate of 25 ml/minute.

3) Acid Precipitation and Crystallization for PQQ Purification

The isoelectric point of target product PQQ is pH 2.75. At 20-25 degree C., in pH 7.0 water solution, the solubility of PQQ is 1-2 mg/ml. The solubility of PQQ will be lowered if the temperature and pH values of the solution are reduced gradually. Large amount of PQQ will be precipitated if the solution is adjusted to pH 2.75, and 98% of PQQ will be crystallized if the temperature of the solution is further reduced to 2-8 degree C. Therefore, acid precipitation and low temperature crystallization is used for PQQ purification. Detailed steps are describe as following:

Step 1: Adjusting the Solution Containing PQQ with Acid

Purified PQQ solution collected from DEAE column is adjusted to pH 2.75 with 2N HCl, stirred for 10 minutes.

Step 2: Crystallization PQQ Under Low Temperature

PQQ solution at pH 2.75 is put in a 2-8 degree C. refrigerator for 5-7 days till PQQ is crystallized completely.

4) Collecting Crystallized PQQ

All the instruments used in the following steps are pre-washed with pH 2.75 HCl water solution cooled to 2-8 degree C., and kept at 2-8 degree C. before use.

Step 1: Collecting PQQ

The solution containing acid precipitated and crystallized PQQ is centrifuged in a large volume, high speed, refrigerated centrifuge (HITACHI CR22E high speed refrigerated centrifuge) at 10000 rpm, 4 degree C. for 20 minutes. PQQ is collected after centrifugation.

Step 2: Washing PQQ

Collected PQQ is stirred and washed in pH 2.75 HCl water solution pre-cooled to 2-8 degree C. After washing, PQQ is centrifuged in a centrifuge (HITACHI CR22E high speed refrigerated centrifuge) at 10000 rpm, 4 degree C. for 20 minutes. Repeat this step 2 times (total washing 3 times). Final product PQQ is collected after centrifugation. PQQ sample is tested for PQQ concentration and purity. Final product PQQ is kept in a negative 80 degree C. freezer for pre freezing.

Step 3: Frozen PQQ Product

Brown-red frozen PQQ power is obtained from a freezing machine.

5) Optimizing PQQ Purification Techniques with Ultrafiltration Cassettes

The above described technique produces at least 85% pure PQQ. However, if the above technique is further optimized, better than 98% pure PQQ is produced.

Ultrafiltration Cassettes is employed to optimize PQQ purification techniques. Analyzing PQQ purified (85% pure or better) with the technique disclosed in Process of purifying PQQ in Part Two, it is discovered that the PQQ powder contains about 14% impurity proteins, with some water, NaCl and some unknown ingredients.

In order to eliminate impurities eluted PQQ solution and obtain pure PQQ powder, the eluted PQQ solution from DEAE column is further filtered through 5K/8K/10K/30K/50K Ultrafiltration Cassettes (from Milipore™), Ultrafiltration system (Centramate™) Tangential Flow Filtration System (from Pall Co.) to eliminate impurity proteins before isoelectric point precipitation (acid precipitation) step. Eluted PQQ solution is tested for its impurity proteins content before and after each step of ultra filtration (from 5K to 8K to 10K to 30K to 50K Ultrafiltration Cassettes) by Lowry method, which is a protein content test well known in those skilled in the art. Table 6 shows the filtrating effects of Ultrafiltration Cassettes:

TABLE 6

PQQ Concentrations Before and After Filtration

|  | PQQ concentration before Ultrafiltration Cassettes (g/l) | PQQ concentration after Ultrafiltration Cassettes (g/l) | Protein concentration before Ultrafiltration Cassettes (g/l) | Protein concentration after Ultrafiltration Cassettes (g/l) |
| --- | --- | --- | --- | --- |
| 5K | 1.32 | 1.12 | 0.84 | 0.11 |
| 8K | 1.32 | 1.24 | 0.84 | 0.13 |
| 10K | 1.32 | 1.26 | 0.84 | 0.37 |
| 30K | 1.32 | 1.27 | 0.84 | 0.42 |
| 50K | 1.32 | 1.29 | 0.84 | 0.45 |

The ultrafiltrating results indicate that using 8 K Ultrafiltration Cassette to eliminate impurity proteins in eluted PQQ solution will produce 98% pure or better PQQ in the following steps of isoelectric point precipitation (acid precipitation) and crystallization (low temperature crystallization).

The alternative way to eliminate impurity proteins is ultrafiltrating the supernatant of fermentation liquid before purification through DEAE (Diethylaminoethyl) column chromatography, using the same Ultrafiltration Cassettes. The alternative way to eliminate impurity proteins is ultrafiltrating the supernatant of fermentation liquid before purification through DEAE (Diethylaminoethyl) column chromatography, using the same Ultrafiltration Cassettes. The same purity of 98% PQQ powder is also produced this way.

The foregoing examples illustrate certain exemplary embodiments from which other embodiments, alternatives, variations, and modifications will be apparent to those skilled in the art. Accordingly, the invention is intended to embrace all other such alternatives, modifications, and variations that fall within the spirit and scope of the appended claims.

What is claimed is:

1. A method for preserving a dairy product by inhibiting spoilage or pathogenic bacteria, fungi, or yeast growth in the dairy product, comprising:
   a) admixing an effective amount of purified Pyrroloquinoline quinone (PQQ) with a dairy product;
   b) culturing the spoilage or pathogenic bacteria, fungi, or yeast including heating the mixture of the dairy product to 37 degrees C. and shaking the dairy product for 6 to 9.5 hours to reach the spoilage or pathogenic bacteria, fungi, or yeast growth phase;
   c) cooling the mixture down to 4 degrees C.;
   wherein said effective amount of PQQ is 0.1 to 100 mg/L of the dairy product.

2. The method of claim 1, wherein the inhibiting includes blocking respiration of spoilage or pathogenic bacteria, fungi, or yeast in the dairy product, thereby inhibiting metabolism of the spoilage or pathogenic bacteria, fungi, or yeast in the dairy product.

3. The method of claim 1, wherein the dairy product is a milkshake or pearl milk tea.

4. The method of claim 1, wherein the dairy product is selected from the group consisting of cow's milk, buffalo's milk, goat's milk and sheep's milk.

5. The method of claim 1, wherein the dairy product is selected from the group consisting of butter, cream, cottage cheese, yogurt, kefir, mozzarella cheese, fresh cheese, ripe cheese and parmesan cheese.

6. The method of claim 1, wherein the dairy product is milk, milk powder or infant formula milk powder.

7. The method of claim 1, wherein the purified PQQ is soluble and blended in the dairy product.

* * * * *